US006117340A

United States Patent [19]
Carstens

[11] Patent Number: 6,117,340
[45] Date of Patent: Sep. 12, 2000

[54] POOL VACUUM PREFILTERING METHOD, UTILIZING CENTRIFUGAL FORCE

[76] Inventor: Christopher Carstens, 1042 Tropic Ave., Santa Ana, Calif. 52705

[21] Appl. No.: 08/881,722

[22] Filed: Jun. 24, 1997

Related U.S. Application Data

[63] Continuation-in-part of application No. 08/432,916, May 1, 1995, abandoned.
[51] Int. Cl.⁷ .................................................. B01D 21/26
[52] U.S. Cl. ........................ 210/788; 210/806; 210/512.1
[58] Field of Search ............................... 210/512.1, 787, 210/788, 295, 296, 299, 304, 258, 169, 416, 806, 416.2; 15/353

[56] References Cited

U.S. PATENT DOCUMENTS 3,558,484   1/1971   Carr ...................................... 210/512.1
4,597,871   7/1986   Okouchi et al. ...................... 210/512.1
4,798,679   1/1989   Treene ..................................... 210/169
5,263,225  11/1993   Winters ..................................... 55/466

Primary Examiner—David A. Reifsnyder

[57] ABSTRACT

The present invention is a device for separation of particulates with widely different densities from swimming pool waters open to contamination from windblown debris. Vacuum hose cleaning of the bottoms swimming pools requires pre-filtering for leaf, branch, and grass removal before the water passes to the primary filter. The present invention is a low pressure, liquid filled, cylindrical vessel situated vertically wherein the vacuumed mixture of leaves, branches, grass, soil, gravel, and water is introduced tangentially to the interior walls of the cylindrical vessel. An axially located, perforated collection pipe is connected to external piping permitting water draw-off. The tangentially flowing contaminated waters release their leaves, branches, and grass into an annular flowing zone close to the cylindrical vessel walls while heavier soil particles and gravel fall to the floor of the vessel.

3 Claims, 2 Drawing Sheets

6,117,340

POOL VACUUM PREFILTERING METHOD, UTILIZING CENTRIFUGAL FORCE

This is a continuation in part of application Ser. No. 08/432,916, filed May 1, 1995, now abandoned.

FIELD OF TECHNOLOGY

The present invention relates to the field of swimming pool vacuuming devices.

BACKGROUND

Windblown materials found on the floors and sides of water-filled swimming pools consist generally of three classes of materials. A first class comprises a low-density related material of things such as water-soaked leaves, branches, and grass. A second class comprises a high-density related material of larger soil particles and small gravel or sand of greater than about 0.5 mm in diameter. A third class comprises the fine silt and dust of less than about 0.5 mm in diameter. Regular removal of these classes of materials, cumulatively called bottom material, is essential for aesthetic and health reasons.

Removal of low-density related material is generally accomplished in one of two ways. The first method adds water to the swimming pool and does not remove fine soil and silt or high-density related material. In this first method, a garden hose is attached to a vacuum head so that vacuum is created at the inlet of the device. The water from the garden hose is mixed with the water and materials drawn into the vacuum head from the bottom of the pool as they are all passed through a conduit to a bag with open, loose weaving. The looseness of weave of the bag is designed so that water, fine soil and silt, and high density related materials are able to pass through weave of the bag material leaving the lower density related materials behind.

The second method makes use of the pool's filter and pump apparatus to vacuum all three classes of materials from the pool bottom. This method begins with the vacuuming of water and bottom materials into a vacuum head and then passing that water/bottom materials mixture into a hose approximately 1–2. inches in diameter. The negative pressure required for this vacuuming is supplied by an existing pump normally drawing pool water through the pool filter. The inlet to the filter is changed from its normal operation so that inlet is attached to the other end of the hose attached to the vacuum head. Although fine soil and silt are effectively removed from the pool water in the pool filter, low-density related materials quickly overwhelm the pool filter and plug it. To extend the vacuuming process without plugging the pool filter, a prefilter is typically located between the vacuum head and the inlet to the pool filter.

This prefilter must be enclosed to maintain vacuum pressure from the pool filter pump. The prior art prefilters attach at one end to the hose carrying the flow of the water/bottom materials mixture from the vacuum head. That attachment is sealingly adapted to the top a cylindrical can perforated on its bottom and sides. The outlet of the prior art prefilters is sealingly adapted to the top rim of the perforated can to effect a flow of water through the inside of the can to the outside. The outlet of the prior art prefilter is adapted to attach to a length of hose or conduit leading to the inlet of the pool filter.

The low-density related materials tend to quickly plug the perforations of the can in the prior art prefilter because water-soaking makes them flexible and capable of being drawn onto the perforation openings by the vacuum water flow. Such a limitation reduces the effective vacuuming time when low-density related materials are a significant part of the bottom materials. In addition, the trapping of high-density related materials in the prefilter tends to accelerate the plugging of the prefilter by adding weight to the accumulation of low-density related material therein. The vacuum pump must be shut off and the prefilter cleaned before effective vacuuming is resumed. The can perforations of the prefilter are designed to permit passage of both fine soil and silt and high-density related material through the prefilter to the pool filter.

Although a combination of the first and second methods is effective for complete removal of all bottom material without plugging a prefilter, such a method is inefficient because the first method disturbs a part or all of the fine soil and silt from the pool bottom into the pool water. Typical settling time is about 30 to 45 minutes before the second method can be used to remove the other bottom material.

SUMMARY OF THE INVENTION

The present invention is a device for separation of particulates with widely different densities from swimming pool waters open to contamination from windblown debris. Vacuum hose cleaning of the bottoms swimming pools requires pre-filtering for leaf, branch, and grass removal before the water passes to the primary filter. The present invention is a low pressure, liquid filled, cylindrical vessel situated vertically wherein the vacuumed mixture of leaves, branches, grass, soil, gravel, and water is introduced tangentially to the interior walls of the cylindrical vessel. An axially located, perforated collection pipe is connected to external piping permitting water draw-off. The tangentially flowing contaminated waters release their leaves, branches, and grass into an annular flowing zone close to the cylindrical vessel walls while heavier soil particles and gravel fall to the floor of the vessel. Fine soil and silt leave the vessel with the cleaned water.

DETAILED DESCRIPTION OF THE INVENTION

The present invention will now be discussed with reference to FIGS. 1 and 2.

Bucket 3 is a 6 gallon, cylindrical plastic bucket with a Bucket Bottom 3A and Bucket Sides 3B, wherein the top rim of Bucket Sides 3B attaches to a screw top Lid 5, also plastic and preferably made of clear plastic. Bucket 3 is about 2 feet tall and about 1½ feet in diameter. Lid 5 sealingly engages Bucket 3 so that a vacuum of up to 6–7 psi may be maintained to effect the objects of the present invention. Lid 5 has two holes, one whose outer edge is located within 1–2 inches of the seal effected between Lid 5 and Bucket 3 and the other located in the center of Lid 3.

An Inlet Pipe 1 is comprised of an Inlet Pipe Section 1A and Inlet Pipe Section 1B. An Outlet Pipe 2 is comprised of an Outlet Pipe Section 2A and Outlet Pipe Section 2B. Inlet Pipe 1 and Outlet Pipe 2 are, respectively, rigid pipes 1½ and 3 inches in diameter and made of plastic such as ABS or PVC and have hose attachment means (not shown) for attachment of 1½ inch diameter vacuum hoses typical for use by vacuum cleaning of swimming pools. Inlet Pipe Section 1B is further comprised of Nozzle Means 1C, comprising a 1½ inch to 1 inch reducing fitting.

Figure 1:
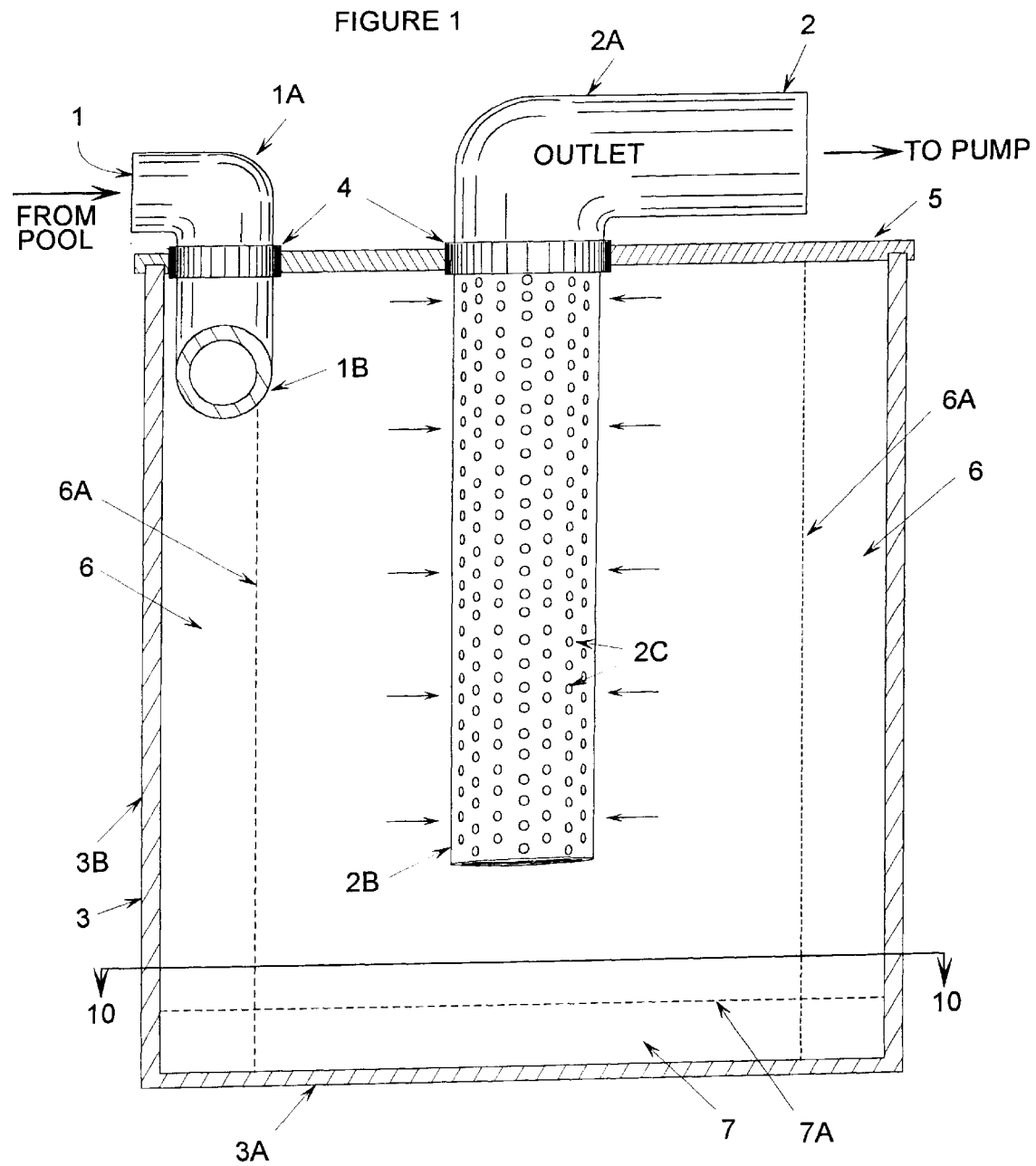
FIG. 1 is a cross section of the cylindrical vessel showing the preferred vertical orientation of the present invention in operation.
Figure 2:
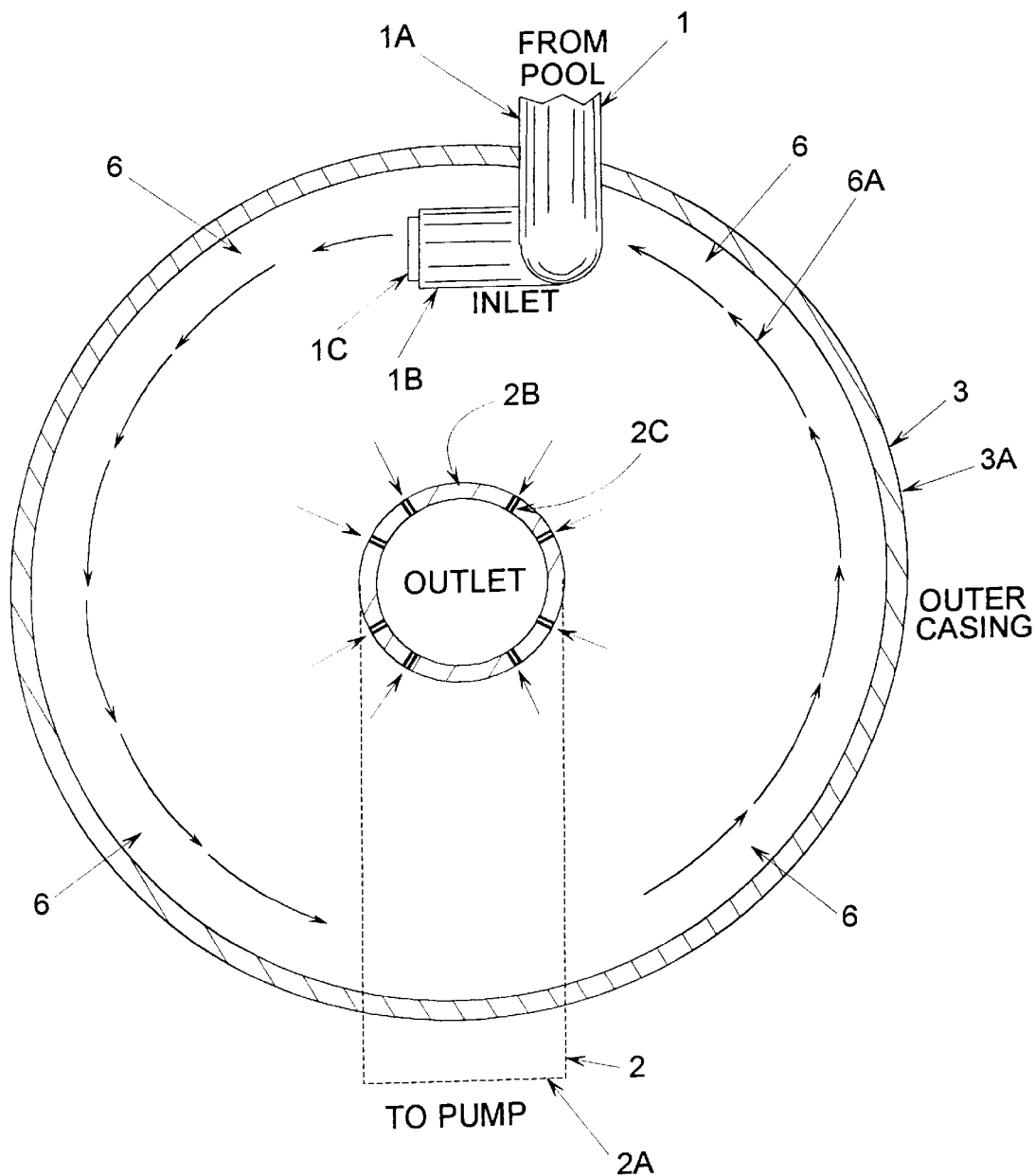
FIG. 2 is a Cross Section 10 shown in FIG. 1 and viewed from beneath the bucket.

Inlet Pipe 1 and Outlet Pipe 2 are situated so that they pass through the holes in Lid 5 and so that their pipe sections lie above or below Lid 5, as shown in FIG. 1. Inlet Pipe 1 passes through the hole in Lid 5 nearest the outer edge of Lid 5. Outlet Pipe 2 passes through the hole in the center of Lid 5. Sealing Means 4 are combinations of pipe couplings and gaskets joining the separate pipe sections of Inlet Pipe 1 and Outlet Pipe 2 so that a gasket may be interposed between such sections to effect vacuum pressure seals between Lid 5 and Inlet Pipe 1 and Outlet Pipe 2. When Inlet Pipe 1 and Outlet Pipe 2 are joined to vacuum hose pieces attached at their distal ends to a vacuum head and pool filter inlet respectively, the completed apparatus forms a system that delivers substantial negative pressure created by the pool filter pump to the vacuum head at the bottom of a swimming pool.

Inlet Pipe Section 1B further comprises pipe fittings sufficient to direct the vacuumed flow of water/bottom material mixture tangentially to the interior of Bucket Side 3B. Although FIG. 1 shows one 90 degree turn in the downward vertical run of pipe from Sealing Means 4 for Inlet Pipe 1, other means and pipe fittings can accomplish the object of directing the water/bottom material mixture with sufficient tangential force to cause the fluid in the water-filled Bucket 3 to create and Annular Flowing Zone 6 with Zone Boundary 6A. The Annular Flowing Zone 6 retains the low-density related material in its circular flow while high-density related material tends to fall to Bottom Zone 7 with Zone Boundary 7A, and area more quiescent than higher up in Bucket 3.

Outlet Pipe Section 2B is about 2 feet long, 3 inches in diameter, and contains Perforations 2C about ¼ inch in diameter at about ½ inch hole spacings. The bottom end of Outlet Pipe Section 2B is solid and without holes. In operation, a water/bottom material mixture enters Bucket 3 through Inlet Pipe 1, accelerated to a desired velocity by Nozzle Means 1C. Desired tangential fluid velocities are generally above 0.25 feet per second. The tangentially introduced mixture separates—the low-density related material is retained in the Annular Flowing Zone 6 and reduces the diameter of the Zone Boundary 6A by new addition. Such addition does not interfere with the flow of water and fine soil and silt through Perforations 2C and through Outlet Pipe 2 to the hose connected to the pool filter until the Zone Boundary comes within about 2–3 inches of Perforations 2C. High-density related material generally falls to Bottom Zone 7 and does not accumulate quickly enough to interfere with the flow of water through Perforations 2.

The present invention with a clear plastic Lid 5 permits the operator to inspect the rate of accumulation of low-density related materials. Instead of waiting for reduced efficiency vacuuming (as in second prior art method above), the operator experiences virtually no loss of vacuuming pressure until the Bucket 3 is nearly filled with low-density related material and can easily tell when to shut down his system for removal of the low- and high-density related material. Actual test results have been successful beyond expectations, yielding long vacuuming runs with no interference in removal of bottom material.

Another unexpected advantage from the present invention is that the high-density related material no longer is removed at the pool filter, resulting in easier cleaning and reduced wear on the filter material from the coarser particles. It has been found that the preferred embodiment described above operates to effect the objects of the invention with fluid flow of from 10 to 50 gallons per minute through the Inlet Pipe 1.

It has been found that the water/bottom material mixture may comprise water, high density materials comprising sand, gravel, and soil, water soaked low density materials comprising grass, leaves, branches and twigs, non-water soaked low density materials comprising grass, leaves, branches and twigs, and fine low density material. The high density materials and water soaked low density materials (which are grass, leaves, branches and twigs which will not float in water and have a higher specific gravity than water) when fed tangentially into the cylindrical pressure vessel migrate to the inside wall of that vessel when a rotating annular flowing zone is established as described above. The non-water soaked materials (grass, leaves, branches and twigs which will float in water and have a lower specific gravity than water) will either remain substantially fixed in a radial path between the inside wall of the cylindrical pressure vessel and the outside wall of the perforated pipe or will tend to migrate towards the outside wall of the perforated pipe and away from the inside wall of the cylindrical pressure vessel.

The fine low density material, such as silt and small pieces of low density materials that will pass through the perforations of the perforated pipe, are drawn into the perforated pipe and withdrawn with all the water entering the cylindrical pressure vessel.

As described above, the rotating annular flowing zone is established such that the high density materials and water soaked low density materials migrate toward the inside wall of the cylindrical pressure vessel by action of centrifugal force, non-water soaked low density materials are maintained substantially in radial suspension, unless such materials become water soaked and thereby migrate to the inside wall of the cylindrical pressure vessel, and water and fine low density material are withdrawn from the cylindrical pressure vessel through the perforated pipe.

It is a further improvement in the art to maintain the non-water soaked low density materials within the rotating annular flowing zone sufficiently long to water soak them such that they become water soaked low density materials operation when non-water soaked materials are fed into the cylindrical pressure vessel. The prior art has failed to describe or appreciate that non-water soaked materials may be effectively separated from the water/fine low density materials portion of a water/bottoms material mixture by maintaining them in suspension or inward migration within the rotating annular flowing zone of the present invention.

I claim:

1. A method of vacuum pre-filtering a swimming pool having a water/bottom material mixture comprising water, relatively high density materials comprising sand gravel and soil, water soaked relatively low density materials comprising grass, leaves, branches and twigs, non-water soaked relatively low density materials comprising grass, leaves branches and twigs and fine relatively low density materials; comprising:

(a) tangential introduction of the water/bottom material mixture into a swimming pool vacuum prefilter comprising a cylindrical pressure vessel with a perforated pipe aligned along the axis of the cylindrical pressure vessel, to create in the vacuum prefilter a rotating annular zone between an inside wall of the cylindrical pressure vessel and an outside wall of the perforated pipe;

(b) establishing the rotating annular flowing zone such that the relatively high density materials and water soaked relatively low density materials migrate toward the inside wall of the cylindrical pressure vessel by action of centrifugal force;

(c) maintaining non-water soaked relatively low density materials substantially in radial suspension, unless such materials become water soaked and thereby migrate to the inside wall of the pressure vessel; and (d) withdrawing from the cylindrical pressure vessel through the perforated pipe water and fine relatively low density materials.

2. A method as in claim 1 wherein the tangential fluid velocity within the rotating annular flowing zone next to the inside wall of the cylindrical pressure vessel is above 0.25 feet per second.

3. A method as in claim 1 wherein the cylindrical pressure vessel further comprises a bottom zone to which the relatively high density materials at the inside walls of the pressure vessel downwardly migrate by force of gravity.

* * * * *